United States Patent [19]

Nobel

[11] Patent Number: 5,058,836

[45] Date of Patent: Oct. 22, 1991

[54] ADAPTIVE AUTOPILOT

[75] Inventor: Charles I. Nobel, Newtown Square, Pa.

[73] Assignee: General Electric Company, Philadephia, Pa.

[21] Appl. No.: 457,877

[22] Filed: Dec. 27, 1989

[51] Int. Cl.$^5$ .......................... G01C 21/24; G05D 1/06
[52] U.S. Cl. .................................. 244/176; 244/3.15; 244/191; 244/195; 364/459
[58] Field of Search .......................... 244/3.1, 3.2, 3.15, 244/3.21, 323, 160, 176, 171, 180, 191, 195; 364/430, 433, 334, 459

[56] References Cited

U.S. PATENT DOCUMENTS

| | | | |
|---|---|---|---|
| 3,624,367 | 11/1971 | Hamilton | 244/3.20 |
| 4,071,894 | 1/1978 | Schuldt | 364/430 |
| 4,699,333 | 10/1987 | Pinson | 244/3.21 |
| 4,783,744 | 11/1988 | Yuch | 244/3.20 |
| 4,791,573 | 12/1988 | Zemany et al. | 364/459 |

*Primary Examiner*—Joseph F. Peters, Jr.
*Assistant Examiner*—Virna Lissi Mojica

*Attorney, Agent, or Firm*—Allen E. Amgott; Paul Checkovich

[57] ABSTRACT

A control system for the reentry phase of a reentry type vehicle with the vehicle having aerodynamic control surfaces for controlling the attitude of the vehicle during reentry includes an estimating device, such as an extended Kalman filter, for estimating dynamic aerodynamic operational parameters of the vehicle in response to status parameters of the vehicle, a sensing device for supplying the status parameters, an autopilot device for generating a drive command signal in response to the dynamic aerodynamic operaational parameters and an actuator device, which may include an electric motor or smaller hydraulic one than prior systems, for controlling the aerodynamics control surfaces in response to the drive command signal. Computation necessary for estinmating is used to determine a more accurate drive command signal than is typically available from prior systems, thereby permitting a smaller, lighter weight actuator to be used. If the operating characteristics of the vehicle over the entire flight regime are known, then the status parameters may be used to select the appropriate operating characteristics, which have been previously stored, without need to resort to estimation.

14 Claims, 4 Drawing Sheets

ADAPTIVE AUTOPILOT

BACKGROUND OF THIS INVENTION

The present invention relates to an adaptive autopilot and, more specifically, to an adaptive autopilot for a reentry type vehicle, wherein size and weight constraints are of paramount importance.

Some strategic missile systems are required to be targetable to hardpoint installations, target-defense systems, and relocatable and moving targets. Delivery of payloads with extreme accuracy requires "smart" reentry vehicles to sense while in flight and then home onto a selected target. These requirements necessitate improved accuracy of advanced maneuvering reentry vehicles with a desired reduction of weight, cost and on-board power demand for the reentry navigation, guidance and control system.

Prior reentry vehicle control systems have used a high performance hydraulic actuator, having a piston for moving aerodynamic control surfaces. Such a system requires substantial power, is heavy, and may leak during storage in the interval between installation at a launch site and actual use. Preventive maintenance may require periodic inspection and testing to ensure that such leakage has not occurred. In addition, these systems typically use an outer control loop to control maneuver acceleration and an inner control loop to damp vehicle airframe oscillations. A control signal is available at the output of the inner loop for energizing the actuator. However, the inner and outer control loops of prior systems do not provide an especially accurate control signal which in combination with the large hydraulic actuator leads to a "brute force" type of system.

It would be desirable to have a system that could estimate the operating dynamic characteristics, or parameters, required by the reentry vehicle, or airframe, in response to actual status parameters of the vehicle so that appropriate settings of the aerodynamic control surfaces could be achieved and maintained for obtaining the desired flight path and performance with a minimal amount of intervention from the actuator for attaining the desired dynamic operating characteristics. The system also should be able to be implemented to minimize its weight and size. In addition it would be desirable to eliminate the need for a heavy hydraulic actuator.

Accordingly, it is an object of the present invention to provide an adaptive autopilot or control system for a reentry type vehicle wherein the weight and size of the system is reduced from those of prior systems.

Another object of the present invention is to provide an adaptive autopilot or control system for a reentry type vehicle wherein the system does not rely on hydraulic actuation for moving aerodynamic control surfaces.

Yet another object of the present invention is to provide an adaptive autopilot for a reentry type vehicle wherein the system provides more computation for estimating dynamic aerodynamic operational parameters in response to status parameters, thereby enabling the size and high performance requirements of the actuator to be reduced.

SUMMARY OF THE INVENTION

In accordance with the present invention, a control system for the reentry phase of a reentry type vehicle with the vehicle having aerodynamic control surfaces for controlling the attitude of the vehicle during the reentry phase comprises estimating means for estimating dynamic operational parameters of the vehicle in response to status parameters of the vehicle and to an actuator indication signal, sensing means coupled to the vehicle and to the estimating means for generating a drive command signal in response to the dynamic aerodynamic operational parameters and actuator means having a response characteristic $\omega_a$ and coupled to the autopilot means for controlling the aerodynamic control surfaces in response to the drive command signal for generating the actuator control signal indicative of the orientation of the aerodynamic control surfaces. The actuator means may include an electric motor.

The autopilot means may include acceleration loop compensation means for controlling vehicle maneuver acceleration and rate loop compensation for damping airframe pitch rate oscillations. The autopilot may be operable in a first mode when the natural frequency $\omega_{SP}$ of the vehicle is less than a first predetermined value, operable in a second mode when the natural frequency $\omega_{SP}$ of the vehicle is greater than a second predetermined value and operable in a third mode when the natural frequency $\omega_{SP}$ of the vehicle is equal to or greater than the first value or equal to or less than the second value. The first value may be equal to the response characteristic $\omega_a$ of the actuator means and the second value may be equal to twice the response characteristic $\omega_a$ of the actuator means.

The estimating means may include an extended Kalman filter (EKF). The EKF may include one summer means having a non-inverting input constituting an input of the EKF for receiving measured status parameter values and an inverting input for receiving an estimation measurement signal indicative of the corrected measurement values and for generating a measurement error signal in response to the algebraic combination of the measured status parameters and the estimation signal, gain matrix means for generating a state estimation correction signal in response to the measurement error signal and another summer means having a non-inverting input for receiving the state estimation correction signal and another non-inverting input for receiving an uncorrected data estimation signal wherein the another summer algebraically combines the state estimation signal and the uncorrected state estimation signal for generating a state corrected or updated signal which is available at the output of the another summer means that also constitutes the output of the EKF. The EKF further includes delay means having an input coupled to the output of the another summer for generating a delayed state corrected signal, state matrix means for generating the uncorrected state estimation signal in response to the delayed state corrected signal and measurement matrix means for generating the estimation signal in response to the uncorrected state estimation signal. The EKF may include a general purpose computer, such as a microprocessor programmed for efficiently processing matrix manipulations.

The dynamic aerodynamic operational parameters may include natural frequency ($\omega_{SP}$), vehicle natural damping $Z_{SP}$), vehicle gain ($K_q$) and path break frequency ($\omega_p$) while the states parameters may include rate (q), normal acceleration ($A_N$) and condition signal ($\delta$).

In another aspect of the present invention, a method for controlling the reentry phase of a reentry type vehicle, the vehicle having aerodynamic control surfaces for controlling the attitude of the vehicle during the reentry phase comprises obtaining operating status parameters of the vehicle, estimating dynamic aerodynamic operational parameters of the vehicle in response to the status parameters, including orientation of the aerodynammic control surfaces, and controlling the orientation of the aerodynamic control surfaces in response to the dynamic aerodynamic operational parameters.

In yet another aspect of the present invention, the dynamic operational parameters may be known for expected regimes of flight for the reentry vehicle so that the dynamic operational parameters may be stored such as in a look-up table and accessed by actual status parameters. Accordingly, a method for controlling the reentry phase of a reentry type vehicle having aerodynamic control surfaces for controlling the attitude of the vehicle during the reentry phase comprises obtaining predetermined operating status parameters of the vehicle, controlling the orientation of the aerodynamic control surfaces in a first mode in response to the operating status parameters when the natural frequency $\omega_{SP}$ of the vehicle is less than a first predetermined value, controlling the orientation of the aerodynamics control surfaces in a second mode in response to the operating status parameters when the natural frequency $\omega_{SP}$ of the vehicle is greater than a second predetermined value and controlling the orientation of the aerodynamic control surfaces in a third mode in response to the operating status parameters when the natural frequency $\omega_{SP}$ of the vehicle is equal to or greater than the first value or equal to or less than the second value.

The features of the invention believed to be novel are set forth with particularity in the appended claims. The invention itself, however, both as to organization and method of operation, together with further objects and advantages thereof, may best be understood by reference to the detailed description taken in connection with the accompanying drawings.

DETAILED DESCRIPTION

Figure 1:
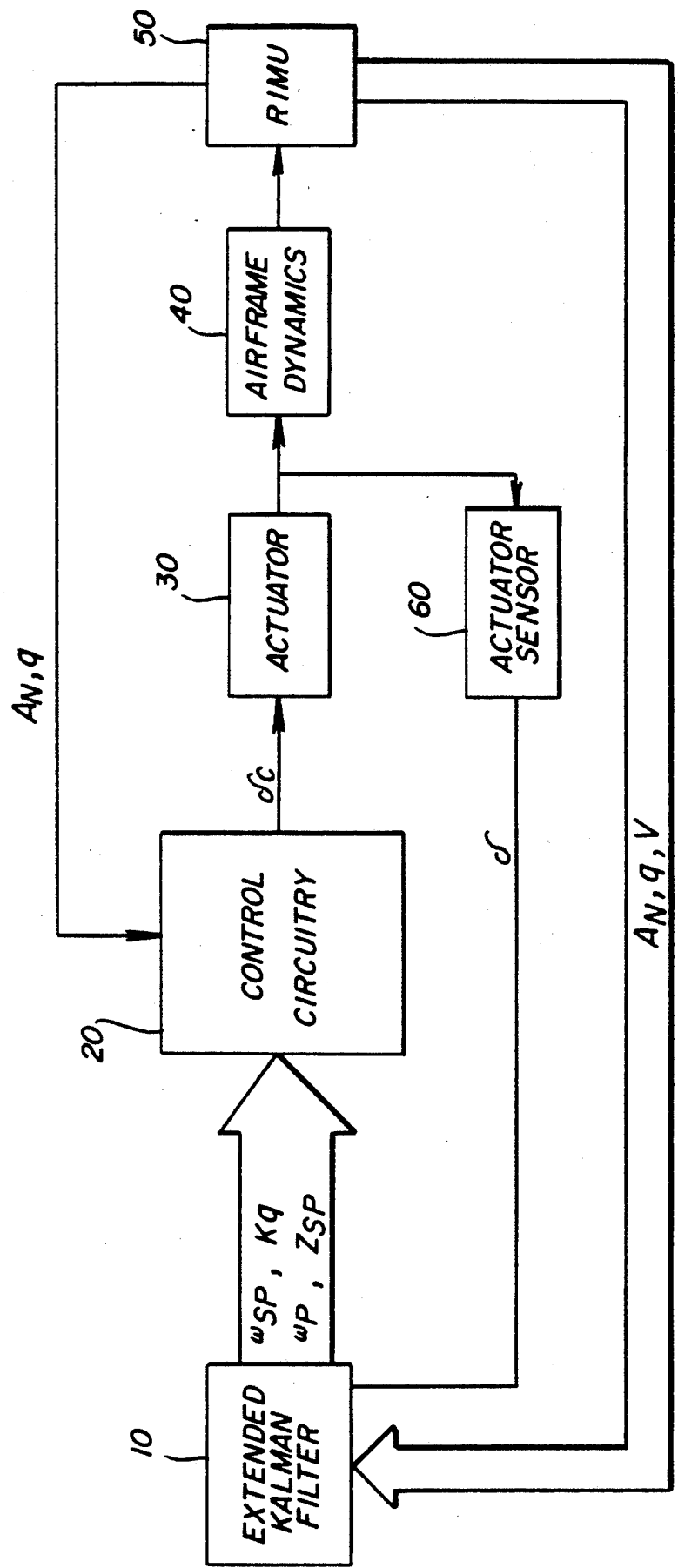
FIG. 1 is a block diagram of an adaptive autopilot system in accordance with the present invention.

Referring to FIG. 1, a block diagram of an adaptive autopilot system in accordance with the present invention is shown.

The autopilot system includes estimating means 10, such as an extended Kalman filter (hereinafter "EKF"), control circuitry 20, actuator 30, airframe dynamics 40, sensing means, such as reentry inertial measurement unit (RIMU), 50 and actuator sensor 60. Actuator sensor 60 may be integral actuator 30. EKF 10 supplies estimated dynamic aerodynamic operational parameters of the reentry vehicle, or airframe, to control circuitry 20 in response to actual status parameters received by EKF 10. Control circuitry 20 selects control parameters, including desired gain and response characteristics, in response to the operational parameters supplied thereto from EKF 10. The operational parameters provided to control circuitry 20 may include: airframe natural frequency ($\omega_{SP}$); airframe natural damping ($Z_{SP}$); airframe gain ($K_q$); and path break frequency ($\omega_p$), wherein $\omega_x$ (radians) equals $2\pi f_x$. Control circuitry 20 also receives vehicle normal acceleration $A_N$ and pitch rate (q) from RIMU 50. The inverse of path break frequency $\omega_p$ (i e., $1/\omega_p$) is the time it takes the reentry vehicle or airframe when freely suspended or during flight to turn into a steady wind in the form of an input step. The transition in a very short interval from a no wind condition to a steady wind in a predetermined direction acting on the airframe or vehicle may be considered to be an input step function.

EKF 10 develops the operational parameters in response to actual status, or state, parameters of the vehicle. The status parameters may include: velocity (V); pitch rate (q); and vehicle normal acceleration $A_N$ that are received from RIMU 50. EKF 10 is also supplied with a condition signal $\delta$ from actuator sensor 60, wherein the condition signal $\delta$ is indicative of the position or degree of extension of the actuator control shaft (not shown) which moves the airframe control surfaces (not shown) of airframe dynamics 40 for effecting desired maneuvering operations. The degree of extension of the actuator control shaft is indicative of the orientation of the airframe control surfaces. EKF 10 estimates the operational parameters based on an algorithm, a more detailed description of which is included along with the description of FIG. 5 hereof.

Actuator 30 includes an electric motor (not shown) for positioning the airframe control surfaces of airframe dynamics 40. The control surfaces are analogous to ailerons, rudder, flaps, etc. of conventional fixed winged aircraft. Actuator 30 is able to use an electric motor rather than a hydraulic actuator of prior systems due in part to the operational combination of EKF 10 and control circuitry 20. The system in accordance with the present invention trades off size and weight of the actuator system for additional computation time which permits a more accurate estimation and therefore a more accurate actuator command signal $\delta_c$ to be obtained. By providing a more accurate estimation of the action to be taken, EKF 10 permits a smaller, lighter-weight actuator 30 to be used. Further, inasmuch as smaller in-flight corrections may be anticipated because of the more accurate estimation of the action required to be taken, it is possible to replace the hydraulic actuator of prior systems by an electric motor or use a smaller hydraulic actuator. In order to save weight and size, the smallest motor having the desired response for driving the control surfaces while overcoming aerodynamic drag should be used.

The actual state or status of the reentry vehicle is determined by RIMU 50 which includes inertial gyroscopes and accelerometers arranged to supply analog or digital signals such as pitch rate, normal acceleration and velocity which are indicative of vehicle status. The gyroscopes and accelerometers of RIMU 50 are mechanically and electronically aligned to the structural body of the reentry vehicle as is known in the art.

Figure 2:
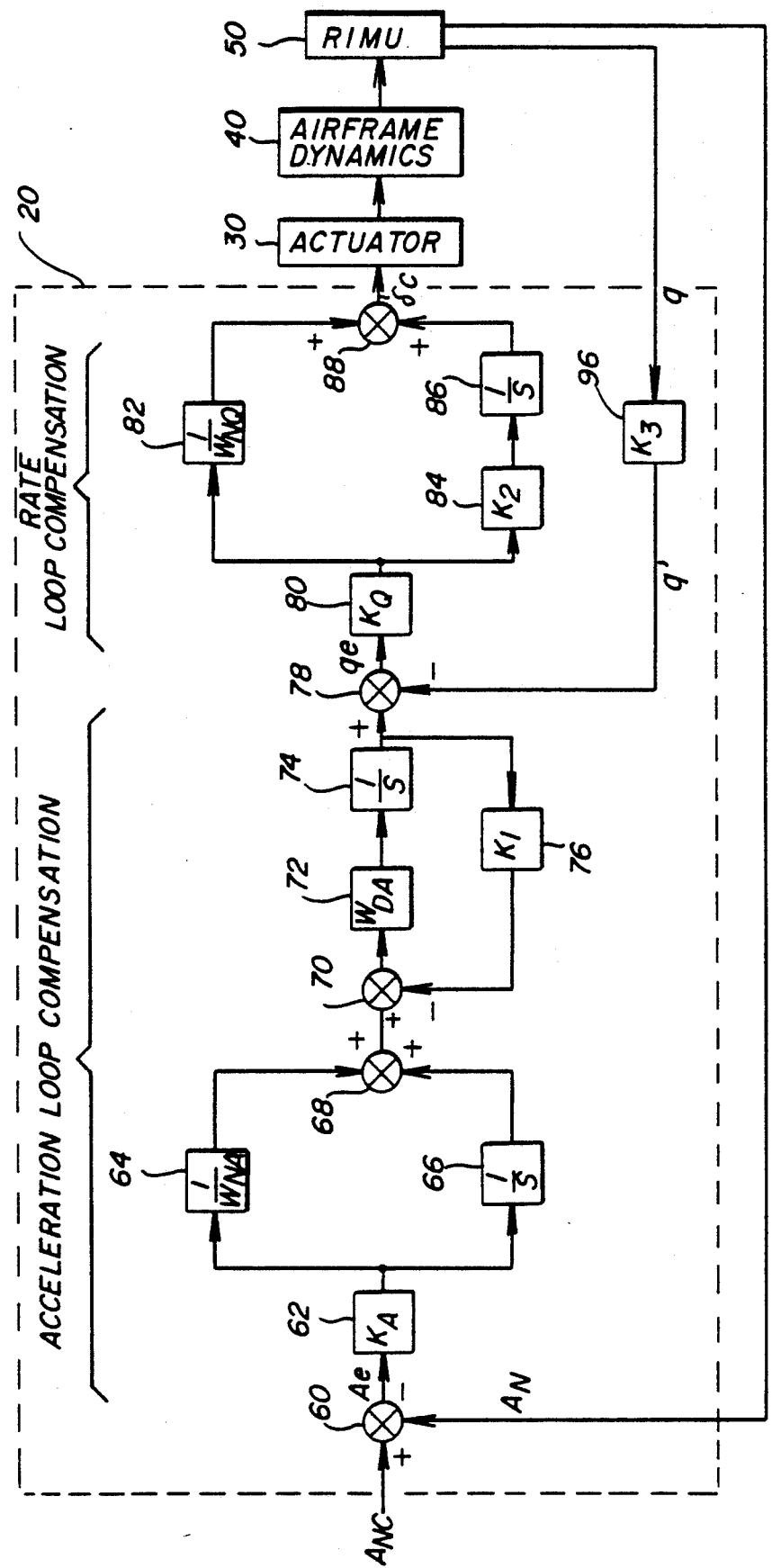
FIG. 2 is a schematic block diagram showing details of the adaptive autopilot circuitry of FIG. 1.

Referring to FIG. 2, a schematic block diagram of control circuitry 20 of FIG. 1 is shown. Control circuitry 20 includes frequency sensitive components whose influence on the drive command signal $\delta_c$, which is supplied to actuator 30 from the output of control circuitry 20, is determined primarily in response to the natural frequency ($\omega_{SP}$) of the reentry vehicle. Natural frequency $\omega_{SP}$ is the natural oscillation frequency that a reentry vehicle or airframe would experience during dynamic flight if no aerodynamic control were used and which oscillation frequency results from aerodynamic restoring moments operating on the vehicle or airframe during such flight.

Generally, the value of natural frequency ($\omega_{SP}$) of the vehicle is small at high altitude and increases in value in a non-linear fashion as the altitude decreases. The natural frequency ($\omega_{SP}$) is a function of overall vehicle aerodynamic stability and the dynamic pressure $(\frac{1}{2})(\rho V^2)$ experienced by the vehicle. EKF 10 (FIG. 1) estimates natural frequency ($\omega_{SP}$).

The following parameters and constants are used in the circuitry of FIG. 2.

| Airframe characteristics | |
|---|---|
| $W_{NA})$ | Fixed based on vehicle characteristics from wind tunnel tests available from manufacturer. |
| $W_{DA})$ | |
| $W_{NQ})$ | |
| $K_A$ | Function of how effective airframe control surface is in obtaining airframe maneuver acceleration. |
| $K_Q$ | Function of how effective airframe control surface is in obtaining airframe angular pitch rate motion. |
| Operational Constants | Range |
| $K_1$ | $0 \leq K_1 \leq W_{NA}/W_{DA}$ |
| $K_2$ | $0 \leq K_2 \leq 1$ |
| $K_3$ | $0 \leq K_3 \leq 1$ |

The values of $K_2$ and $K_3$ change inversely with respect to natural frequency ($\omega_{SP}$). The upper value of $K_1$, i.e., $W_{NA}/W_{DA}$, is typically less than about 20.

The circuitry of FIG. 2 is shown divided into two sections, one for acceleration loop compensation and another for rate loop compensation. The acceleration loop is used predominantly to control vehicle maneuver acceleration while the rate loop is used predominantly to damp vehicle airframe pitch rate oscillations.

The normal maneuver acceleration command signal $A_{NC}$, which is typically generated in an onboard vehicle guidance system, is supplied to one input of summer 60 and the normal acceleration signal $A_N$ (representing the actual normal acceleration of the reentry vehicle) from RIMU 50 is provided to an inverting input of summer 60. The normal acceleration signal $A_N$ and command signal $A_{NC}$ are algebraically combined such as by adding by summer 60. The resultant acceleration error signal $A_e$ is provided to multiplying means 62 where acceleration error signal $A_e$ is multiplied by pre-established scaling constant $K_A$ and the product is provided to both compensation means 64 and integrator means 66. The symbol 1/s represents an integrator, wherein s is the complex variable $\sigma + j\omega$ of the s domain achieved by a Laplace transform from the time domain. Compensation means 64 multiplies the signal available at its input by the inverse of the airframe characteristic $W_{NA}$ and supplies the result to one input of summer 68. Another input of summer 68 receives the resultant integrated signal from integrator 66. Summer 68 algebraically combines or adds the signals provided thereto and supplies the result to one input of summer 70.

The output of summer 70 is connected to an input of compensation means 72. Compensation means 72 multiplies the signal available at its input by the airframe characteristic $W_{DA}$ and supplies the product from its output to the input of integrator 74. The output of integrator 74 is connected to an input of scaling means 76 which has an output connected to the inverting port of summer 70. Scaling means 76 conditions, such as by multiplying, the integrated signal available at the output of integrator 74 by a pre-established scaling constant $K_1$ and supplies a signal representing the product to summer 70. Summer 70 algebraically combines the signals available at its inputs and supplies the resulting signal to compensation means 72. Summer 70, compensation means 72, integrator 74 and scaling means 76 form a negative feedback loop.

The output of integrator 74 is also connected to an input of summer 78. An inverting input of summer 78 is connected to an output of scaling means 96 for receiving a modified pitch rate signal q'. Scaling means 96 has an input, which constitutes an input of adaptive autopilot circuitry 20, connected to an output of RIMU 50 for receiving the pitch rate signal q. Scaling means 96 conditions, such as by multiplying, the pitch rate signal q by a pre-established scaling constant $K_3$ for forming the modified pitch rate signal q'.

The modified pitch rate signal q' from scaling means 96 and the integrated signal from integrator 74 are algebraically combined by summer 78 and the resulting pitch rate error signal $q_e$ is supplied to an input of multiplying means 80 where the resulting pitch rate error signal $q_e$ from summer 78 is multiplied by pre-established scaling constant $K_Q$. A signal representing the product of the operation performed by multiplying means 80 is supplied to both compensation means 82 and to scaling means 84.

Compensation means 82 multiplies the signal available at its input by the inverse of the airframe characteristic $W_{NQ}$ and supplies the result to one input of summer 88. Another input of summer 88 receives the resultant integrated signal from integrator 86. Scaling means 84 conditions, such as by multiplying, the signal received from multiplying means 80 by pre-established scaling factor $K_2$. The product from scaling means 84 is provided to integrator 86 which integrates the product signal received from scaling means 84 and supplies the resultant integrated signal to another input of summer 88. The output of summer 88, which constitutes the output of control circuitry 20 is connected to an input of actuator 30. Summer 88 algebraically combines the signals available at its inputs and supplies the resultant drive command signal $\delta_c$ to actuator 30. The drive command signal $\delta_c$ is used to command operation of the electric motor of actuator 30 for proper positioning of the airframe control surfaces of airframe dynamics 40.

Figure 3:
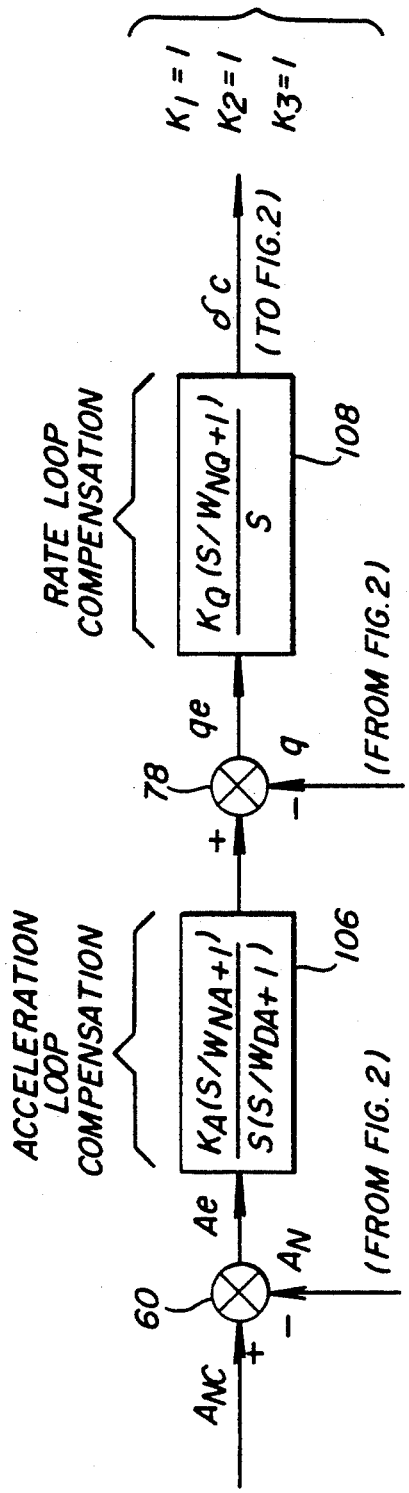

Referring to FIG. 3, a block diagram of a portion of the circuitry of FIG. 2 is shown. The circuitry of FIG. 3 represents in simplified form the predominant mode of operation of the circuitry of control circuitry 20 of FIG. 2 during a first operational mode when constants $K_1$, $K_2$ and $K_3$ are each equal to one. This condition may be assumed to predominate when the airframe frequency $\omega_{SP}$ is less than the response characteristic $\omega_a$ of actuator 30 (FIG. 1) such as may be expected during the high altitude reentry phase of the flight of the vehicle. Response characteristic $\omega_a$ of actuator 30 is the upper (highest) frequency at which actuator 30 can receive commands and still correctly respond within a desired time interval.

In the first operational mode, the acceleration loop compensation circuitry 106 for the first mode is simplified by substituting the numeric value for $K_1 = 1$ for the appropriate acceleration loop compensation circuit component of control circuitry 20 of FIG. 2, and writing the resulting indicated functions as a fraction. The resulting fraction, indicative of the functional operation of compensation circuitry 106, has an s term in the numerator and an $s^2 + s$ term in the denominator signifying that there is high gain at low frequencies, medium gain at mid frequencies and low gain at high frequencies of the acceleration error signal $A_e$.

Likewise, the rate loop compensation circuitry 108 for the first mode, wherein the rate loop determines the amount of damping of airframe frequency $\omega_{SP}$, is simplified by substituting the numeric value for $K_2 = K_3 = 1$ for the appropriate acceleration loop compensation circuit components of control circuitry 20 of FIG. 2, and writing the resulting indicated functions as a fraction. The resulting fraction, indicative of the functional operation of compensation circuitry 108, has an s term in the numerator and an s term in the denominator, signifying that there is high gain at low frequencies and medium gain at mid to high frequencies of the pitch rate error signal $q_e$.

In the first mode of operation, the desired acceleration response is limited by airframe frequency $\omega_{SP}$. When the airframe frequency $\omega_{SP}$ is less than the response characteristic $\omega_a$ of actuator 30, the airframe frequency $\omega_{SP}$ is damped for obtaining the desired acceleration response. Operation of the first mode determines the value of the response characteristic $\omega_a$ of actuator 30 needed for proper vehicle control.

Figure 4:
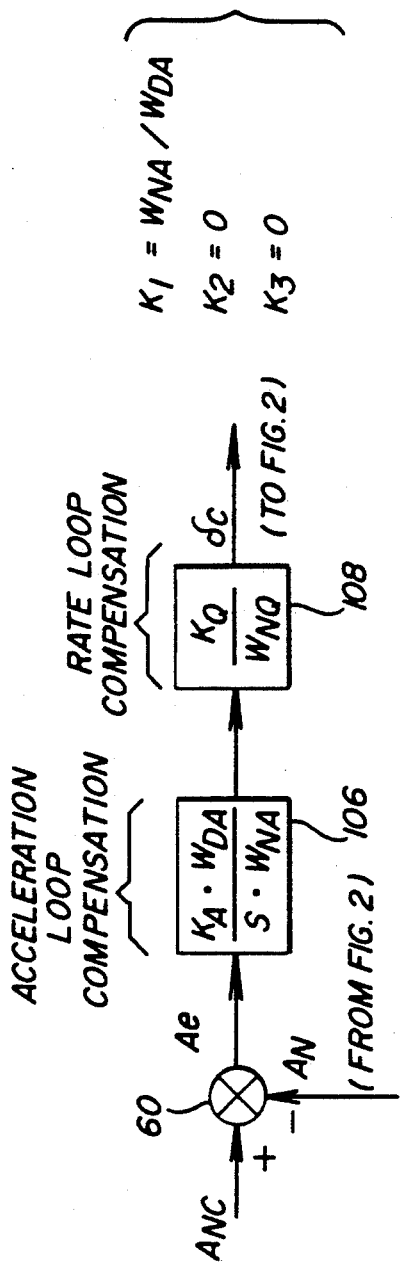
FIGS. 3 and 4 are block diagrams of a portion of the circuitry of FIG. 2 for respective predetermined modes of operation of the adaptive autopilot system.

Referring to FIG. 4, a block diagram of a portion of the circuitry of FIG. 2 is shown. The circuitry of FIG. 4 represents in simplified form the predominant mode of operation of the circuitry of control circuitry 20 of FIG. 2 during a third operational mode when constants $K_2$ and $K_3$ equal zero and constant $K_1$ equals $W_{NA}/W_{DA}$. This condition may be assumed to predominate when the airframe frequency $\omega_{SP}$ is greater than two times the response characteristic $\omega_a$ of actuator 30, such as may be expected during the low altitude reentry phase of the flight of the vehicle. In the third mode, acceleration loop compensation circuitry 106 may be functionally represented by a fraction having an s term in the denominator, signifying that there is high gain at low frequencies, and low gain at mid and high frequencies of the acceleration error signal $A_e$ and rate loop compensation circuitry 108 may be functionally represented by a fraction having no s terms (i.e., constant). Therefore rate loop compensation circuitry 108 is substantially not frequency sensitive when the system is operating in the third mode. In the third mode, the desired acceleration response may be achieved without damping airframe frequency $\omega_{SP}$ and the response characteristic $\omega_a$ of actuator 30 may be less than airframe frequency $\omega_{SP}$.

In a second operational mode, airframe frequency $\omega_{SP}$ is generally greater than one but less than two times the response characteristic $\omega_a$ of actuator 30. In the second operational mode airframe frequency $\omega_{SP}$ is partially damped. Reference to FIG. 2, with constants $K_1$, $K_2$ and $K_3$ having values lying within their respective permitted ranges as previously indicated, but not the values associated with the circuitry of FIGS. 3 and 4, shows that for operation in the second mode the acceleration loop and partial rate loop damping are applied. That is, airframe frequency $\omega_{SP}$ may be partially damped, whereby the response characteristic $\omega_a$ of actuator 30 may be less than airframe frequency $\omega_{SP}$ for attaining the desired acceleration response. This condition may be assumed to predominate when the airframe frequency $\omega_{SP}$ is greater than one but less than two times the response characteristic of actuator 30, such as may be expected during the mid-altitude reentry phase of the flight of the vehicle.

Thus, control circuitry 20 of FIG. 2 effectively electronically configures itself in real time into an acceleration plus rate loop autopilot as represented by the circuitry of FIG. 3 and an acceleration loop autopilot as represented by the circuitry of FIG. 4 by comparing the airframe frequency $\omega_{SP}$ with the response characteristic $\omega_a$ of actuator 30. That is, control circuitry 20 automatically, or electronically, continuously configures itself in accordance with the circuitry and functions shown in FIGS. 2, 3 and 4 in response to actual operating conditions in order to operate in the predominant control mode required to provide efficiently the desired flight or reentry path. That is, from comparisons of actual operating parameters, the real time operating configuration of circuit 20 is automatically selected. This configuration selection process by control circuitry 20 is continuous so that smooth transitions between the first, second and third modes of operation is obtained. Further, partial influence from a control loop may be achieved. These smooth transitions ensure a continuous command signal $\delta_c$ is applied to actuator 30, thereby eliminating the discrete switching between alternative operational states that was experienced by actuators of prior systems.

Figure 5:
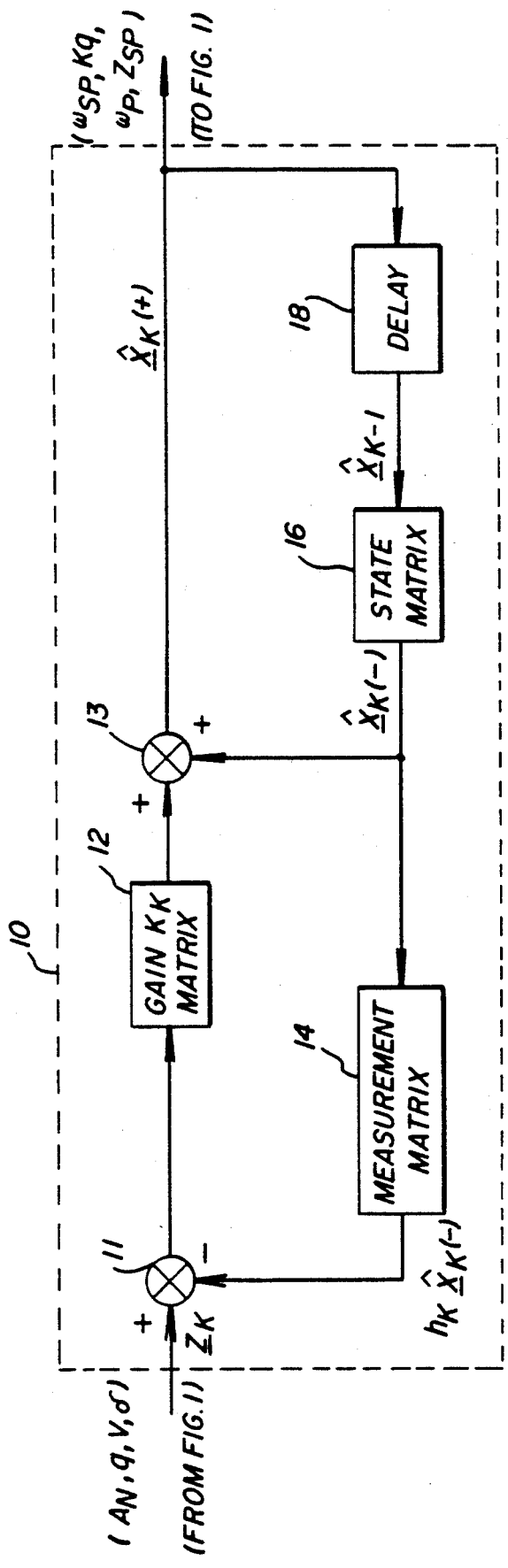
FIG. 5 is a block diagram of a Kalman filter useful with the present invention.

Referring to FIG. 5, a block diagram of an extended Kalman filter useful with the present invention is shown.

Extended Kalman filters are explained in detail in Applied Optical Estimation, edited by A. Gelb et al. (MIT Press 1974), pages 182–188 which is incorporated herein by reference thereto. The notation used in the Gelb et al reference is used herein. In general, an extended Kalman filter applies to non-linear systems and operates by using past estimates to try to linearize non-linear system equations such as may be expected to be encountered in application of the present invention.

Extended Kalman filter 10 includes a summer 11 having an input constituting the input of EKF 10, gain matrix circuitry 12 having an input connected to an output of summer 11, another summer 13 having a non-inverting input connected to the output of gain matrix circuitry 12 and an output constituting the output of EKF 10. EKF 10 further includes delay circuitry 18 having an input coupled to the output of summer 13, state matrix circuitry 16 having an input connected to the output of delay circuitry 18 and an output connected to another non-inverting input of summer 13, and measurement matrix circuitry 14 having an input connected to the output of state matrix circuitry 16 and an output connected to an inverting input of summer 11. The input of EKF 10 receives the vehicle normal acceleration ($A_N$), pitch rate (q) and velocity (V) signals from RIMU 50 (FIG. 1) and the actuator position signal ($\delta$) from actuator sensor 60 (FIG. 1) indicative of the actual values of the respective variable or in output of EKF 10 are available state corrected, or updated, signals including airframe natural frequency signal, airframe gain signal ($K_q$), path break signal ($\omega_{SP}$) indicative of the estimated values of the respective variable or in general format a matrix identified as $X_K$ is available.

Only a single line is shown as an input/output for avoiding undue clutter.

It is to be recognized that each signal input to or output from EKF 10 will have a respective input or output as appropriate. Likewise, circuitry internal EKF 10 is shown connected by single lines wherein data transfer between and among EKF circuit component may also be accomplished in parallel where desired.

For application in the present invention the following state equations in the form of continuous differential equations are used.

$$f_1(x,t) = \dot{q}_D = A1 q_D + A2 q + ((A3 A4)/A5) - A3)\cdot \delta + A3 \delta_c \quad (1)$$

$$f_2(x,t) = \dot{q} = q_D \quad (2)$$

$$f_3(x,t) = \dot{A}_N = V A4 q - A4 A_N \quad (3)$$

$$f_4(x,t) = \dot{\delta} = -A5\delta + A5\delta_c \quad (4)$$

$$f_5(x,t) = \dot{A1} = 0 \quad (5)$$

$$f_6(x,t) = \dot{A2} = 0 \quad (6)$$

$$f_7(x,t) = \dot{A3} = 0 \quad (7)$$

$$f_8(x,t) = \dot{A4} = 0 \quad (8)$$

$$f_9(x,t) = \dot{A5} = 0 \quad (9)$$

wherein $$A1 = -2 Z_{SP} \omega_{SP}, \quad (10)$$

$$A2 = -\omega_{SP}^2 \quad (11)$$

$$A3 = ((K_q \omega_{SP}^2)/\omega_p)\omega_a, \quad (12)$$

$$A4 = \omega_a \quad (13)$$

$$A5 = \omega_p \quad (14)$$

$q_D$ is the angular acceleration of the vehicle and a dot over a variable indicates the derivative of the variable with respect to time.

A measurement matrix $\tilde{H}(x(t),t)$ is defined as $$\tilde{H}(x(t),t) = \begin{bmatrix} 0 & 1 & 0 & 0 & 0 & 0 & 0 & 0 & 0 \\ 0 & 0 & 1 & 0 & 0 & 0 & 0 & 0 & 0 \\ 0 & 0 & 0 & 1 & 0 & 0 & 0 & 0 & 0 \end{bmatrix},$$

an estimate of current state matrix x is defined as $$X = \begin{bmatrix} q_D \\ q \\ A_N \\ \delta \\ A1 \\ A2 \\ A3 \\ A4 \\ A5 \end{bmatrix}$$

and an actual measurements matrix is defined as $$Z_K = \begin{bmatrix} q \\ A_N \\ \delta \end{bmatrix},$$

wherein Z=HX indicating that matrix $Z_K$ equals matrix X premultiplied by matrix $H(\hat{X}(t),t)$.

As shown in table 6.1-1 at page 188 of Gelb et al., the state estimate update equation may be represented by $$\hat{X}_k(+) = \hat{X}_k(-) + K_k[Z_k - h_k(\hat{X}_k(-))]$$

wherein the $h_k(X_k(-))$ operation is performed by measurement matrix circuitry 14, the $Z_k - h_k(\hat{X}_k(-))$ operation is performed by summer 11 and the $K_k[Z_k - h_k(\hat{X}_k(-))]$ operation is performed by gain matrix circuitry 12 and the $\hat{X}_k(-) + K_k[Z_k - h_k(\hat{X}_k(-))]$ operation is performed by summer 13, wherein the $\hat{X}_k(-)$ value is available at the output of state matrix circuitry 16 and the resulting value of $\hat{X}_k(+)$ is available at the output of summer 13.

For other variable shown in the table 6.1-1 of Gelb et al. $\omega(t)$ and $Y_k$ are state and measurement noise matrices having covariances Q(t) and $R_k$, respectively. The noise values are determinable without undue experimentation from atmospheric disturbances expected and the type of devices used by RIMU 50, respectively. F(X)t,t) for the present invention is a 9×9 matrix wherein the elements of the matrix are the partial derivatives of the functions $f_1$, (X,t), $f_2$(X,t), $f_3$, (Xt), $f_4$(X,t), $f_5$(X,t), $f_6$(X,t), $f_7$(X,t), $f_8$(X,t) and $f_9$(X,t). Note that elements of the lower five rows of the matrix are all zero.

That is, F(X(t),t) is represented by

| | $A_1$ | $A_2$ | 0 | $\frac{A_3 A_4}{A_5} - A_3$ | $q_p$ | $q$ | $\left(\frac{A_4}{A_5} - 1\right)\delta + \delta_c$ | $\frac{A_3}{A_5}\delta$ | $\frac{A_3 A_4}{A_5^2}\delta$ |
|---|---|---|---|---|---|---|---|---|---|
| | 1 | 0 | 0 | 0 | 0 | 0 | 0 | 0 | 0 |
| | 0 | $VA_4$ | $-A_4$ | 0 | 0 | 0 | 0 | $V_q - A_N$ | 0 |
| | 0 | 0 | 0 | $-A_5$ | 0 | 0 | 0 | 0 | $-\delta + \delta_c$ |
| $F(\hat{X}(t),t) =$ | 0 | 0 | 0 | 0 | 0 | 0 | 0 | 0 | 0 |
| | 0 | 0 | 0 | 0 | 0 | 0 | 0 | 0 | 0 |
| | 0 | 0 | 0 | 0 | 0 | 0 | 0 | 0 | 0 |
| | 0 | 0 | 0 | 0 | 0 | 0 | 0 | 0 | 0 |
| | 0 | 0 | 0 | 0 | 0 | 0 | 0 | 0 | 0 |

Figure 6:
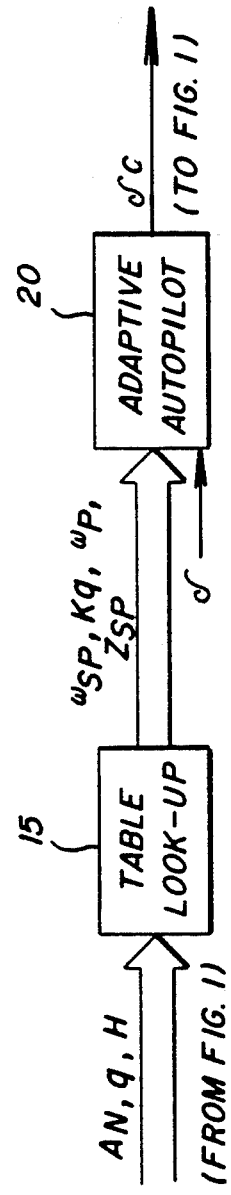
FIG. 6 is a block diagram of circuitry useful with the present invention.

Referring to FIG. 6, a block diagram of circuitry useful with the present invention is shown. If vehicle response characteristics ($W_{SP}, Z_{SP}, \omega_p, K_q$) are accurately known from wind tunnel tests and/or flight tests for all possible flight regimes of the vehicle, then EKF 10 and its associated estimation function as shown in FIG. 1 is not needed. In such case, benefits of the present invention may be achieved by directly connecting outputs of RIMU 50 to inputs of look up table circuitry 15 for supplying the normal acceleration ($A_N$), pitch rate (q) and altitude (H) signals thereto. Inasmuch as the vehicle response characteristics $W_{SP}$, $Z_{SP}$, $\omega_p$, $K_g$ are assumed known for all possible flight regimes, the values of $A_N$, q and H which are indicative of the actual flight regime of the vehicle, may be used to address the values of $\omega_{SP}$ and $\omega_{Kq}$.

Thus has been illustrated and described an adaptive autopilot or control system for a reentry type vehicle wherein the weight and size is reduced from those of prior systems and further wherein the system does not rely on hydraulic actuation for moving aerodynamic control surfaces. Also shown and described is an adaptive autopilot or control system wherein the system provides more computation for estimating dynamic aerodynamic operationals parameters in response to status parameters, thereby enabling the size, weight and high performance requirements of the actuator to be reduced.

While only certain preferred features of the invention have been shown by way of illustration, many modifications and changes will occur to those skills in the art. It is to be understood that the appended claims are intended to cover all such modifications and changes as fall within the true spirit and scope of the invention.

What is claimed is:

1. A control system for the reentry phase of a reentry type vehicle, the vehicle having aerodynamic control surfaces for controlling the attitude of the vehicle during the reentry phase, comprising:

estimating means for estimating dynamic aerodynamic operational parameters of the vehicle in response to status parameters of the vehicle and to an actuator indication signal;

sensing means coupled to the vehicle and to the estimating means, the sensing means for supplying the status parameters to the estimating means;

autopilot means coupled to the estimating means, the autopilot means for generating a drive command signal in response to the dynamic aerodynamic operational parameters; and actuator means having a response characteristic $\omega_a$ and coupled to the autopilot means, the actuator means for controlling the aerodynamic control surfaces in response to the drive command signal and for generating the actuator control signal indicative of the orientation of the aerodynamic control surfaces.

2. The control system as in claim 1, wherein the actuator means includes an electric motor.

3. The control system as in claim 2, wherein the autopilot means includes:

acceleration loop compensation means for controlling vehicle maneuver acceleration; and rate loop compensation means coupled to the acceleration loop compensation means, the rate loop compensation means for damping airframe pitch rate oscillations.

4. The control system as in claim 3, wherein the autopilot means is operable in a first mode when the natural frequency $\omega_{SP}$ of the vehicle is less than a first predetermined value, is operable in a second mode when the natural frequency $\omega_{SP}$ of the vehicle is greater than a second predetermined value and is operable in a third mode when the natural frequency $\omega_{SP}$ of the vehicle is equal to or greater than the first predetermined value or equal to or less than the second predetermined value.

5. The control system as in claim 4, wherein the first predetermined value is equal to the response characteristic $\omega_a$ of the actuator means and further wherein the second predetermined value is equal to twice the response characteristic $\omega_a$ of the actuator means.

6. The control system as in claim 1, wherein the estimating means includes an extended Kalman filter.

7. The control system as in claim 1, wherein the dynamic aerodynamic operational parameters of the vehicle include natural frequency ($\omega_{SP}$), vehicle natural damping ($Z_{SP}$), vehicle gain ($K_q$) and path break frequency ($\omega_p$).

8. The control system as in claim 1, wherein the status parameters of the vehicle include velocity (V), normal acceleration ($A_N$) and pitch rate (q).

9. The control system as in claim 4, further including control circuitry means for effecting smooth transition among the first, second and third mode.

10. A method for controlling the reentry phase of a reentry type vehicle, the vehicle having aerodynamic control surfaces for controlling the attitude of the vehicle during the reentry phase, comprising:

obtaining predetermined operating status parameters of the vehicle;

controlling the orientation of the aerodynamic control surface in a first mode in response to the predetermined operating status parameters when the natural frequency $\omega_{SP}$ of the vehicle is less than a first predetermined value;

controlling the orientation or the aerodynamic control surfaces in a second mode in response to the predetermined operating status parameters when the natural frequency $\omega_{SP}$ of the vehicle is greater than a second predetermined value; and controlling the orientation of the aerodynamic control surfaces in a third mode in response to the predetermined operating status parameters when the natural frequency $\omega_{SP}$ of the vehicle is equal to or greater than the first predetermined value, or equal to or less than the second predetermined value.

11. The method as in claim 10, wherein the predetermined operating status parameters include altitude (H) and velocity (V) of the vehicle.

12. The method as in claim 10, further including effecting smooth transition among the first, second and third mode.

13. A method for controlling the reentry phase of a reentry type vehicle, the vehicle having aerodynamic control surfaces for controlling the attitude of the vehicle during the reentry phase, comprising:

obtaining operating status parameters of the vehicle;

estimating dynamic aerodynamic operational parameters, including natural frequency ($\omega_{SP}$), of the vehicle, in response to the status parameters, including the orientation of the aeordynamic control surfaces, of the vehicle; and controlling the orientation of the aerodynamic control surfaces in response to the dynamic aerodynamic operation parameters wherein the step of controlling includes:

controlling in a first mode when the natural frequency $\omega_{SP}$ of the vehicle is less than a first predetermined value;

controlling in a second mode when the natural frequency $\omega_{SP}$ of the vehicle is greater than a second predetermined value; and controlling in a third mode when the natural frequency $\omega_{SP}$ of the vehicle is equal to or greater than the first predetermined value, or equal to or less than the second predetermined value.

14. The method as in claim 13, further including effecting smooth transition among the first, second and third mode.

* * * * *

UNITED STATES PATENT AND TRADEMARK OFFICE
CERTIFICATE OF CORRECTION

PATENT NO. : 5,058,836

DATED : October 22, 1991

INVENTOR(S) : Nobel

It is certified that error appears in the above-identified patent and that said Letters Patent is hereby corrected as shown below:

On the title page, under item [19], "Nobel" should read --Gido et al.--; and item [75] should be corrected to read as follows:
        --Joseph F. Gido, Wayne; Charles I. Noble,
        Newtown Square, both of Pa.--.

Signed and Sealed this

First Day of June, 1993

*Attest:*

MICHAEL K. KIRK

*Attesting Officer*      *Acting Commissioner of Patents and Trademarks*